June 2, 1970  H. D. IRWIN  3,515,577
APPARATUS AND PROCESS FOR IMPREGNATING POROUS ARTICLES
Filed Sept. 7, 1966  2 Sheets-Sheet 1

INVENTOR
HOWARD D. IRWIN

BY
*Melville J. Hayes*
AGENT

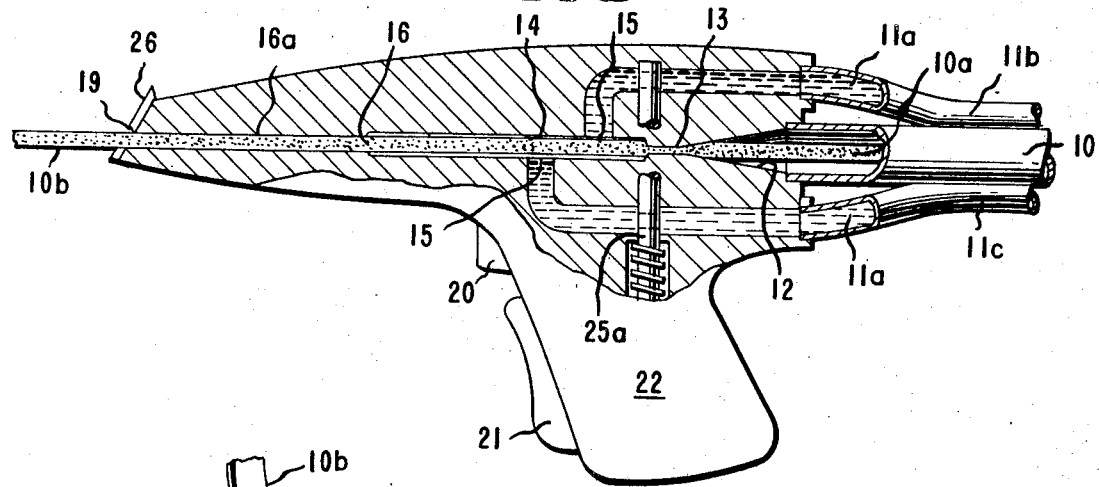
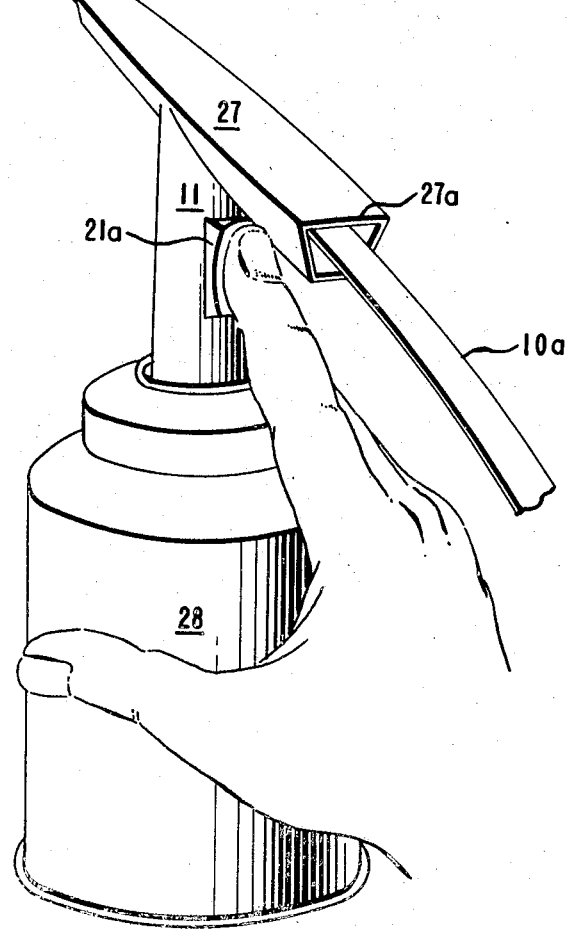

United States Patent Office 3,515,577
Patented June 2, 1970

3,515,577
APPARATUS AND PROCESS FOR IMPREGNATING POROUS ARTICLES
Howard D. Irwin, Wilmington, Del., assignor to E. I. du Pont de Nemours and Company, Wilmington, Del., a corporation of Delaware
Filed Sept. 7, 1966, Ser. No. 577,725
Int. Cl. B05c 3/12
U.S. Cl. 117—115        5 Claims

ABSTRACT OF THE DISCLOSURE

An apparatus and process for impregnating a long strip of porous resilient material (e.g. polyurethane foam) with a liquid (e.g. polyurethane) wherein there are (A) a chamber holding a liquid under pressure, (B) a duct for introducing a pressurized liquid into the chamber (e.g. at about 25–500 p.s.i.), (C) a duct for introducing a strip of porous resilient material into the chamber while compressing the strip, the pressurized liquid causing the strip to move forward at the desired rate, and (D) a duct for conveying the impregnated strip out of the apparatus with little or no compression; the apparatus can be in the form of a gun with a trigger-operated valve to control duct (B), and a trigger-operated cutter to cut the impregnated strip.

---

This invention relates to an apparatus and a process adapted for use in impregnating shaped articles of porous resilient solid materials with liquids, the shaped articles being in the form of long strips, sheets, ropes and the like. The term "porous strip" is often used herein for the sake of convenience in designating the shaped porous articles adapted to be passed through (and impregnated by) the apparatus.

Preferred embodiments of the invention concern an apparatus which can be held in one hand while it is employed for (1) impregnating a porous strip (e.g., a strip or sheet of open-cell foamed elastomer) with a liquid polymeric impregnant material capable of being solidified in situ (within the foamed elastomer) and (2) applying the resulting impregnated strip in the desired position on a strip-receiving member (e.g., the peripheral portion of an automobile windshield).

Expressed broadly, the apparatus of this invention (sometimes referred to herein as "the apparatus") comprises:

(A) An impregnating chamber capable of holding a liquid under super-atmospheric pressure, (B) Duct means communicating with (A) and adapted for continuously introducing a liquid impregnant material under super-atmospheric pressure into (A) from a source of supply of said liquid.

(C) Duct means communicating with (A) and adapted for continuously introducing a strip of porous resilient solid material into (A) from a source of supply of said strip, said duct means (C) comprising:

(C–1) A chamber-inlet portion whose cross-sectional area is less than that of the strip (when the strip is in the non-compressed state) to be passed through it whereby said inlet portion is adapted to compress said strip, (D) Duct means communicating with (A) and adapted for continuously conveying a strip of liquid-impregnated material from (A) to a point outside of said apparatus, said duct means (D) comprising:

(D–1) A chamber-outlet portion whose cross-sectional area is greater than that of said inlet portion (C–1) but not substantially greater than that of the impregnated strip (when in the non-compressed state) to be passed through it. In most cases, the end of the apparatus through which the porous strip is introduced is considered the rear end, and the end where it leaves is considered the "front end."

The present invention also provides a process for impregnating a long strip of porous resilient solid (non-liquid) material with a liquid which comprises:

(1) Feeding an end portion of said strip into an apparatus as described in the previous paragraph so that said end portion extends through chamber inlet portion (C–1), chamber (A) and chamber outlet portion (D–1), and (2) Introducing a continuous stream of liquid into said chamber under a super-atmospheric pressure sufficient (a) To cause said liquid to impregnate said strip and (b) Simultaneously to move the strip continuously through duct means (C) and chamber (A) and duct means (D) as defined in the previous paragraph.

Also provided by the present invention is a process which may be broadly defined as follows: A process for impregnating a long strip of porous resilient solid material with a liquid which comprises:

(I) Compressing said strip while it is moved under confinement towards a body of liquid, (II) Passing said strip through a body of liquid under confinement at super-atmospheric pressure while allowing the strip (a) to resume a non-compressed state, and (b) to become impregnated by said liquid, (III) Passing the resulting impregnated strip out of said body of liquid while maintaining the strip under confinement in a less compressed state than in step (I), and (IV) Maintaining the volume of said body of liquid substantially constant by continuously replacing the amount of liquid removed by said strip, the super-atmospheric pressure in step (II) being maintained at a level sufficient to cause said strip (a) to continue to move from the confinement of step (I) through the confinement of step (III) at the desired speed and (b) to become impregnated to the desired extent with said liquid, the confinement of the strip in steps (I) and (III) being sufficient to maintain suitable confinement of said body of liquid.

In a preferred embodiment of the process, the liquid is a liquid polyurethane composition adapted for conversion in situ (within the strip) to a solid (non-liquid) resilient polyurethane polymer, and the strip is a strip of open-cell polyurethane foam. The pressure in step (II) is preferably about 25 to 500 pounds per square inch in some of the more useful applications of the process.

In certain preferred embodiments of the apparatus invention described above, the apparatus has (1) The general configuration (outside appearance) of a gun adapted to be held and operated by one hand, (2) A handle to fit a hand of a person using the apparatus, (3) The inlet portion C–1 (mentioned above) at the rear end of the impregnating chamber, (4) The outlet portion D–1 (mentioned above) at the front end of the impregnating chamber, (5) An impregnating chamber whose cross-sectional area is greater than that of the porous strip to be passed through it, (6) An outlet portion (D–1) whose cross-sectional area is slightly less than that of the impregnated strip just prior to leaving the impregnating chamber, (7) A trigger in the handle which is operatively connected to a valve in the liquid impregnant duct so that the valve can be opened and closed by pressing the trigger, and (8) A second trigger in the handle which is operatively connected to a knife mounted adjacent the outlet for the impregnated strip so that the knife can be activated to cut through the impregnated strip by pressing the trigger; any or all of the 8 optional features just mentioned can be present in the apparatus.

The invention will be more readily understood by referring to the attached drawings wherein.

Figure 2:
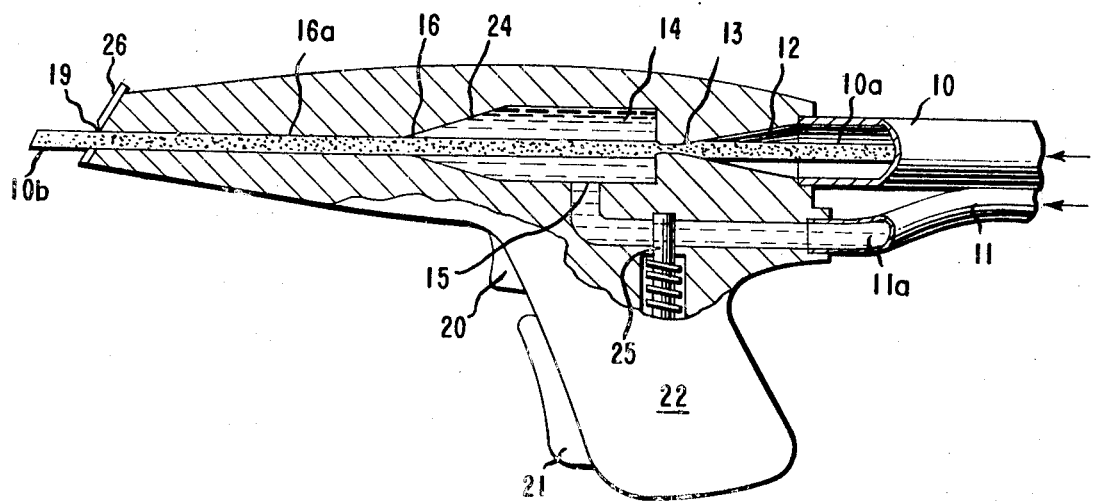
FIG. 2 shows the apparatus of FIG. 1 in the assembled and operating state in central vertical section and partially in side elevation; in this apparatus the cross-sectional dimensions of the impregnating chamber are considerably larger than those of the strip of porous material.

FIG. 3 shows another apparatus in central vertical section and partially in side elevation which differs from that of FIG. 2 mainly in that there are two ducts instead of one for introducing liquid into the chamber, and the cross-sectional dimensions of the impregnating chamber are only slightly larger than those of the porous strip; and FIG. 4 is a perspective view of another embodiment of the apparatus which differs from that of FIG. 2 mainly in that the handle/trigger assembly and horizontal impregnant duct are replaced by an aerosol-type pressurized container from which the liquid impregnant can be introduced vertically into the impregnating chamber by depressing the dispensing valve.

Figure 1:
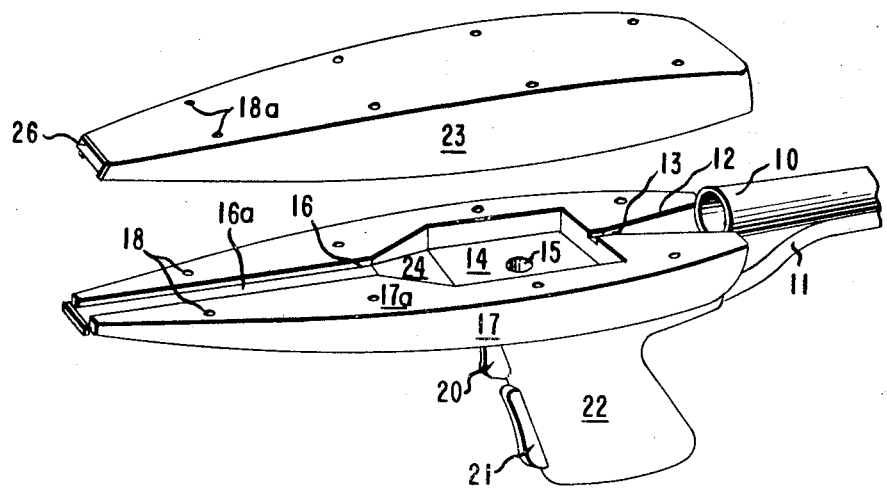
FIG. 1 is a perspective view of an embodiment of the apparatus having the outward appearance of a gun, and having the upper portion of the gun separated from the lower portion at a central horizontal plane, thereby showing in perspective the impregnating chamber and duct means through which the impregnant and the strip of porous material are passed during the impregnating process described above.

The impregnating apparatus or "gun" shown in FIG. 1 has a lower body 17 and an upper body 23; these boat-shaped bodies are made so as to fit sealingly together when the lower face of body 23 is placed in contact with the flat horizontal face 17a of body 17. Bodies 17 and 23 can be locked together by means of bolts (not shown) inserted through holes 18 and 18a. Handle 22 is fastened to the bottom of body 17 by means of screws or other suitable conventional fastening means. The upper portion of body 17 contains the lower half of impregnating chamber 14, inlet duct 12 for introducing an unimpregnated porous strip into the chamber, and outlet duct 16a for conveying an impregnated strip towards the gun outlet upon leaving the chamber. The lower portion of body 23 contains the upper half of chamber 14 and ducts 12 and 16a; thus, the lower face of body 23 (not shown) has the same configuration as that of the upper face of body 17 when viewed from the same angle. Duct 12 comprises a chamber-inlet portion 13 whose cross-sectional area is less than that of a strip to be passed through it en route to the impregnating chamber. Duct 16a comprises a chamber-outlet portion 16 whose cross-sectional area is greater than that of inlet portion 13, but not substantially greater than that of an impregnated strip to be passed through it upon leaving the impregnating chamber. The front end portion 24 of chamber 14 has walls which taper inward and terminate at chamber outlet portion 16. Tube 10 attached to the rear end of duct 12 is a part of the duct means adapted for continuously introducing a porous strip into chamber 14. Duct 11, which passes through the lower rear portion of body 17 and communicates with liquid inlet 15 in the floor of chamber 15, is adapted for continuously introducing a liquid impregnant material under super-atmospheric pressure into chamber 14. Other features of the FIG. 1 apparatus, including the strip-cutting knife 26 at the front end of the gun and the valve trigger 21 and knife trigger 20 in handle 22 are discussed below.

The assembled and operating view of the FIG. 1 impregnating gun as shown in FIG. 2 indicates the manner in which the unimpregnated porous strip 10a passes (during expansion of the strip) into chamber 14, after being compressed at inlet 13, to become impregnated by the pressurized liquid impregnant 11a which continuously flows into chamber 14 by way of duct 11 and inlet 15 while valve 25 is open. The impregnated strip 10b passes through gun outlet 19 by way of chamber outlet 16 and duct 16a. It will be noted that the porous strip is in a substantially less compressed state in outlet 16 and duct 16a than it is in inlet 13; this permits the pressurized liquid in chamber 14 to be the sole means of causing the strip to move forward through the gun under the confinement of inlet 13, outlet 16 and duct 16a. The confinement of the strip at inlet 13, outlet 16 and duct 16a is such that the strip can move forward through the gun at the desired speed while substantially none of the liquid impregnant leaves chamber 14 except that which enters the pores of the porous strip.

Valve trigger 21 can be operatively connected to valve 25 in any manner which permits the valve to be opened and closed by movement of the trigger. For example, a known type of torsion spring arrangement can be employed with the valve and trigger assembly so that inward motion (depression) of the trigger is converted through a lever system (not shown) and torsion spring (shown beneath valve 25) to 90° rotation of the valve stem and resulting opening of valve 25. When pressure is removed from trigger 21, the valve is automatically closed by the torsion spring.

Knife trigger 20 can be operatively connected to knife 26 in any manner which permits the knife to cut the impregnated strip 19 by movement of the trigger; for example, a known type of toggle-activated spring release mechanism (not shown) can be employed with the knife/trigger assembly so that inward motion of the trigger causes a cam to position the knife under tension against a spring followed by first a downward thrust of the knife to cut the strip and then return of the knife 26 to the neutral or non-cutting position shown in FIG. 2.

FIG. 3 shown a different embodiment of the apparatus in the form of an impregnating gun which, like the gun of FIG. 2, can be held and operated by one hand. However, unlike the gun of FIG. 2, it has two separate ducts (11b and 11c) for introducing liquid into chamber 14. Also, the height and width of chamber 14 are only slightly greater than the height and width of porous strip 10a. An advantageous feature of this apparatus is that the liquid introduced by duct 11b can be different from the liquid introduced by duct 11c; for example, the two liquids can differ in composition, viscosity or temperature. Beneficial results are thereby obtainable in the impregnated strip which are difficult or impossible to achieve when using known impregnating devices. For example, the top portion of the moving strip can be impregnated under pressure with a polymer that is adherent to metal, and the bottom portion of the strip can be simultaneously impregnated under pressure with a polymer that is adherent to glass. Dual valve 25a controls the flow of liquids in both ducts in a manner similar to that described above with respect to valve 25 of FIG. 2. The valves and valve stem in the apparatus, of course, would not appear in a true central vertical sectional view of the gun since they are positioned to one side of the central duct carrying the porous strip; but the dual valve structure is included in FIG. 3 for the sake of convenience in illustrating its appearance.

In FIG. 4, the upper boat-shaped portion 27 which contains the impregnating chamber (not shown) is removably and sealingly fastened in a horizontal position atop the vertical duct 11 which has its lower end sealingly fastened in the lid of dispenser 28. Portion 27 has an inlet 27a at its rear end for introducing an unimpregnated strip 10a and an outlet 27b at its front end for discharging an impregnated strip 10b. The internal structure of portion 27 is not shown since it is substantially the same as illustrated in FIG. 2 with respect to duct 12, inlet 13, chamber 14, outlet 16, duct 16a and liquid inlet 15. Dispenser 28 is a known aerosol-type pressurized dispenser containing a propellant and a liquid impregnant. When the dispensing valve activator 21a is depressed by the operator's finger, the valve of dispenser 28 is opened and liquid impregnant flows upward through duct 11 into the impregnating chamber under super-atmospheric pressure, thereby impregnating the porous strip and causing it to move continuously through portion 27 until valve activator 21a is released or until the dispenser is empty.

The embodiments of the novel apparatus shown in the drawings can easily be made so that they can be held in one hand while the same hand (1) operates the means for cutting the impregnated strip and/or the means for opening and closing the liquid supply valve and (2) regulates the position of the gun as required for applying the impregnated strip in the desired position on a strip-receiving member. Porous strip impregnating devices are readily obtainable according to the present invention which are surprisingly easy and economical to make, to use and to maintain in working condition. The apparatus can be made in any desired size; for example, a large floor-mounted unit can be made for impregnating very wide and/or very thick porous sheet materials. The apparatus can of course be equipped with any known suitable type of liquid supply valve, valve regulator and/or strip-cutting apparatus.

The apparatus and process of the present invention are useful for impregnating with a liquid many different kinds of porous strips, sheets and the like including open-cell structures of various synthetic polymers, foam rubber, cellulose sponge, woven and nonwoven fabrics, cords and bulky elastic yarns.

The example which follows is given for the purpose of illustrating the invention. All quantities shown are on a weight basis unless otherwise indicated.

A strip of open-cell polyurethane foam is impregnated with a liquid polyurethane composition as described below. The resulting impregnated strip is useful as a resilient bonding layer for resiliently and sealingly bonding an automobile windshield to the steel windshield-receiving member of an automobile body.

The polyurethane foam contains about 45 cells per lineal inch, is resilient and elastic, has a skeletal structure and a density of 1.8 pounds per cubic foot it is prepared substantially in accordance with the procedure described in U.S. Pat. 3,025,200, Example 7.

The polyurethane foam is impregnated with a liquid polyurethane composition prepared by (a) charging a reaction vessel (equipped with stirrer, thermometer, reflux condenser and nitrogen inlet) with 3110 parts polypropylene glycol (molecular weight 2000), 650 parts petroleum naphtha, 180 parts carbon black and 3080 parts finely divided calcium carbonate; (b) stirring the contents of the vessel while heating to reflux temperature and continuing to stir at this temperature for two hours; (c) removing all of the petroleum naphtha along with any water present in the vessel by distillation; (d) cooling the mixture to 90° C.; (e) adding 780 parts of 4,4'-diphenylmethane diisocyanate and stirring the mixture for 5 minutes; (f) adding 0.25 part stannous octoate and stirring the mixture at 100° C. for 45 minutes and (g) adding 1550 parts of a triol having an average molecular weight of about 6000 and a hydroxyl value of 28 prepared by condensing about 100 moles of propylene oxide with one mole of 1,2,6-hexanetriol, and stirring the resulting mixture at 100° C. for two hours. The resulting liquid polyurethane composition has a content of nonvolatile components of about 100% and a Brookfield viscosity at 25° C. of 2185 poises.

A liquid supply tank is filled with the liquid polyurethane composition, and the tank is equipped with a pump and duct adapted to deliver the liquid to the liquid inlet of the impregnating apparatus used in this example at a pressure of 80 p.s.i. (pounds per square inch).

A 100 foot long strip of the porous polyurethane foam measuring 0.50 inch wide and 0.25 inch thick is wound up on a storage roll. The roll of porous foam strip is placed in a position from which the strip can pass through the impregnating apparatus.

The apparatus employed in this example for impregnating the porous strip is an impregnating gun of the type shown in FIGS. 1 and 2 of the drawings and described above. The following description is set forth in reference to FIGS. 1 and 2. In this particular embodiment, bodies 17 and 23 are made of aluminum, knife 26 and valve 25 are made of steel, and handle 22, triggers 20 and 21 and the tubes for conveying strip 10a and liquid 11a into the gun are made of a tough light-weight plastic material. Other suitable gun construction materials will be obvious to skilled engineers. Bodies 17 and 23 are 5 inches long and 2.25 inches wide at the widest portion. The diameter of duct 11 and inlet 15 is 0.44 inch. Inlet portion 13 is 0.164 inch wide and 0.080 inch high. Chamber 14 at its center is one inch wide and 0.75 inch high; the overall length of chamber 14 is 2.25 inches. Outlet portion 16 is 0.380 inch wide and 0.184 inch high; the same is true of duct 16a and outlet 19. Duct 16a is 1.75 inches long.

While valve 25 remains closed, the end of porous strip 10a is fed into and through the strip-conveying portion of the gun with the aid of a stiff piece of wire or the like whose rear end is attached to the end of the strip. Strip 10a now extends through tube 10, duct 12 (including inlet portion 13), chamber 14 and duct 16a (including portions 16 and 19).

While the gun is held in one hand, the impregnation process is carried out by first pressing trigger 21 to open valve 25 and introduce a continuous stream of liquid 11a from the supply tank (not shown) into chamber 14 under a pressure of 80 p.s.i. The steady flow of pressurized liquid into chamber 14 causes the liquid to impregnate the porous strip 10a, and simultaneously causes the strip to move in a continuous manner through the gun.

The flow of pressurized liquid into the chamber (in combination with the suitable difference in size between inlet 13 and outlet 16) is the sole means of causing the strip to move forward through the gun. Auxiliary moving means (e.g., tension on strip 10b) can be used if desired. While the strip moves towards chamber 14 under the confinement of chamber inlet 13, it is compressed; this squeezes most of the air out of the pores of the foam strip. Upon entering the chamber of pressurized liquid, the strip resumes a noncompressed state; this expansion of the strip facilitates the filling of the pores by the pressurized liquid. The impregnated strip moves out of chamber 14 under the confinement of outlet 16 and duct 16a; here the strip is subjected to less compression than it is at inlet 13.

In modifications of this example, it is also possible to have the strip in a completely noncompressed state in duct 16a, and/or to have the length of duct 16a greatly reduced, when the impregnating conditions are such that there is no undue leakage of liquid from chamber 14 through duct 16a; for example, when using a lower pressure in chamber 14, a higher viscosity liquid, or a more absorbent porous strip. Also, in some applications it will be desirable to extrude a layer of the liquid from the chamber onto the surface of the strip as it is discharged from the gun.

After the first several inches of strip have been discharged from gun outlet 19, and properly impregnated strip is flowing from the gun, trigger 21 is released to close valve 25 and trigger 20 is pressed to cause knife 26 to cut off the strip. These first few inches of strip are discarded. Trigger 21 is pressed again and kept depressed to hold valve 25 open while the desired length of fully impregnated strip 10b is discharged onto a strip-receiving member from gun outlet 19 at a speed of about 25 feet per minute. After the desired length of impregnated strip has been discharged, trigger 20 is pressed to cause knife 26 to cut off the strip. This procedure is repeated until the desired number of impregnated strips have been produced. The length of the impregnated strip which can be produced is limited only by the length of the unimpregnated strip fed into the impregnating gun.

The utility of the impregnated strip produced in this example in a windshield bonding operation is illustrated as follows:

The peripheral portion of the windshield surface which will be in contact with the bonding layer is prepared in advance of the impregnation operation by (a) washing it with a mild detergent solution in warm water, rinsing it with clean water, wiping it with a clean cloth dampened with ethanol and drying it; (b) wiping it with a clean cheese cloth wet with an adhesion-enhancing primer consisting of a 2% solution in ethanol of N,N'-bis(hydroxyethyl-gamma-amino-propyl-triethoxy silane); and (c) allowing the primer to dry for 15 minutes at 25° C.

The portion of the windshield-receiving member which will be in contact with the bonding layer is prepared before the foam impregnation by (1) applying a zinc phosphate coating ("Bonderite" 100), (2) spraying on a 0.001-inch thick coat (dry film thickness) of a primer having the composition given under Formula A below and baking it for 30 minutes at 196° C., (3) spraying on a 0.025-inch thick coat (dry film thickness) of a known automobile enamel (as described in Example 10 of U.S. Pat. 2,934,509) and baking it for 30 minutes at 135° C., and (4) brushing on a coat of a primer having the composition given under Formula B below and allowing it to dry for 15 minutes at 25° C.

FORMULA A

| | Parts |
|---|---|
| Alkyd resin solution | 18.0 |
| Urea formaldehyde resin, 60% solution in butanol | 2.0 |
| Iron oxide | 11.5 |
| Aluminum silicate | 9.0 |
| Barytes | 28.8 |
| Aromatic solvent B.P. 190–210° C. | 16.0 |
| Aliphatic solvent B.P. 190–250° C. | 14.7 |
| | 100.0 |

In Formula A, the alkyd resin is a 40% oil-length dehydrated castor oil modified glyceryl-ethylene glycol phthalate alkyd resin having an acid number of about 8 and a content of unesterified hydroxyl groups equivalent to 4.1% glycerol; this resin is added as a 55% solution in xylene having a Gardner-Holdt viscosity of Y.

FORMULA B

| | Parts |
|---|---|
| Methylmethacrylate hydroxyaminopropyl resin made as described in Example 1 of U.S. Pat. 2,949,445, added as a 30% solution in a 56/44 blend of toluene and isopropanol | 45.0 |
| Polymethylmethacrylate, 40% solution in a volatile organic solvent | 5.5 |
| Acrylic resin/carbon black dispersion [1] | 12.3 |
| Xylene | 30.1 |
| Cellosolveacetate | 0.3 |
| Benzyl butyl phthalate | 6.8 |
| | 100.0 |

[1] Prepared by mixing 35 parts xylene, 50 parts polymethyl methacrylate, 10 parts carbon black, grinding the mixture thoroughly in a ball mill and adding 5 parts xylene.

The windshield bonding operation is completed by (1) employing the impregnating gun in the manner described above to discharge a strip of the impregnated polyurethane foam directly from gun outlet 19 onto the primed periphery of the windshield so that the strip covers the entire periphery, (2) mounting the resulting assembly in place on the steel windshield-receiving member so that the impregnated foam strip is in interposed contact with the entire periphery of the windshield and the steel member, (3) keeping the layers of the assembly in intimate contact with each other while the liquid polyurethane composition is solidified in situ by allowing the assembly to stand for 24 hours at an ambient temperature of 30° C. and a relative humidity of 71% whereby the liquid polyurethane reacts with the moisture in the atmosphere and is converted to a solid polyurethane elastomer. The strength of the bond continues to increase (i.e., the bond continues to cure) for the next few days as the assembly stands at ordinary ambient temperature and humidity (e.g., 25° C. and 50% relative humidity).

The windshield is now integrally bonded to the steel member. The bond has satisfactory strength, resilience and imperviousness to fluids and dust when the automobile is subjected to normal use conditions.

There is no need to transfer the impregnated strip from one strip-receiving member to another when using the apparatus and process illustrated in this example, such transfer often results in handling and adhesion problems.

As will be apparent to those skilled in the art and familiar with the limitations of prior art impregnating devices and methods, the apparatus and process of the present invention provide a worthwhile advance in the art of continuously impregnating porous strips with liquid materials.

In the light of the present disclosure, one skilled in the art will have little difficulty in selecting the best gun construction and impregnating conditions for a particular application. For instance, it might be desirable in the above example to use greater pressure on the liquid in chamber 14; (a) when using a higher viscosity liquid, (b) when faster discharge of the impregnated strip is desired, (c) when using a porous strip having smaller pores and/or (d) when there is a slight reduction in the cross-sectional area of one or more of the strip-conveying ducts. When using a lower viscosity liquid, any tendency towards undue leakage of the liquid through duct 16a can usually be overcome by increasing the length and/or decreasing the cross-sectional area of duct 16a.

When the above example is modified by using the impregnating gun shown in FIG. 3 and described above, using two different specially formulated liquid compositions, the top portion of the strip can be impregnated with a composition which adheres especially well to metal and the bottom portion simultaneously impregnated with a composition which adheres especially well to glass upon solidification of the liquid impregnant. Thus, the invention greatly facilitates the fulfillment of some longstanding needs in the industries which produce bonded assemblies.

I claim:
1. A process for impregnating a long strip of porous resilient solid material or the like with a liquid which comprises
   (I) compressing said strip while it is moved under confinement towards a body of liquid,
   (II) passing said strip through a body of liquid under confinement at super-atmospheric pressure while allowing the strip (a) to resume a noncompressed state, and (b) to become impregnated by said liquid,
   (III) passing the resulting impregnated strip out of said body of liquid while maintaining the strip under confinement in a less compressed state than in step (I), and
   (IV) maintaining the volume of said body of liquid substantially constant by continuously replacing the amount of liquid removed by said strip,
      the super-atmospheric pressure in step (II) being maintained at a level sufficient to cause said strip (a) to continue to move from the confinement of step (I) through the confinement of step (III) at the desired speed and (b) to become impregnated to the desired extent with said liquid, the confinement of the strip in steps (I) and (III) being sufficient to maintain suitable confinement of said body of liquid.

2. A process according to claim 1 wherein said liquid is a liquid polyurethane composition adapted for conversion in situ to a solid resilient polyurethane polymer, and said strip is a strip of open-cell polyurethane foam.

3. A process according to claim 1 wherein said pressure in step (II) is about 25 to 500 pounds per square inch.

4. A process for impregnating a long strip of porous resilient solid material or the like with a liquid which comprises (1) feeding a portion of said strip into an impregnating apparatus so that said portion is fed
through a strip supply duct leading to an impregnating chamber and having an inlet portion adapted to compress said strip,
through an impregnated chamber adapted to hold a liquid under super-atmospheric pressure, and to allow the incoming strip to expand, and
through a strip outlet duct leading from said chamber and adapted to cause less compression of said strip than said inlet portion, and (2) introducing a continuous stream of liquid into said chamber under a super-atmospheric pressure sufficient
to cause said liquid to impregnate said strip, and
to cause said strip to move through said supply duct, impregnating chamber, and outlet duct, whereby the moving strip is under greater compression in said inlet portion than in said outlet duct and it is expanding as it enters said chamber.

5. An apparatus, adapted for use in a continuous process of impregnating a long strip of porous resilient solid material or the like with a liquid, which comprises (A) an impregnating chamber capable of holding a liquid under super-atmospheric pressure, (B) duct means communicating with (A) and adapted for continuously introducing a liquid under super-atmospheric pressure into (A) from a source of supply of said liquid, (C) duct means communicating with (A) and adapted for continuously introducing a strip of porous resilient solid material into (A) from a source of supply of said strip, said duct means (C) comprising (C-1) a chamber-inlet portion whose cross-sectional area is less than that of the strip to be passed through it whereby said inlet portion is adapted to compress said strip, (D) duct means communicating with (A) and adapted for continuously conveying a strip of liquid-impregnated material from (A) to a point outside of said apparatus, said duct means (D) comprising (D-1) a chamber outlet portion whose cross-sectional area is greater than that of said inlet portion (C-1) but not substantially greater than that of the impregnated strip to be passed through it, said apparatus having the general exterior configuration of a gun adapted to be held in one hand, and
having a handle to fit a hand of a person using the apparatus, said handle containing
a trigger operatively connected to a strip-cutting means mounted adjacent duct means (D) so that said cutting means can be activated to cut the impregnated strip by pressing said trigger,
having said inlet portion (C-1) at the rear end of said chamber (A),
having said outlet portion (D-1) at the front end of said chamber (A),
the cross-sectional area of said chamber (A) being greater than that of the strip to be passed through it, and
the cross-sectional area of said outlet portion (D-1) being slightly less than that of said impregnated strip.

References Cited

UNITED STATES PATENTS

| | | | |
|---|---|---|---|
| 2,193,861 | 3/1940 | Crowley | 118—419 X |
| 2,332,538 | 10/1943 | Smith | 264—174 X |
| 2,567,960 | 10/1949 | Myers | 18—3.5 |
| 3,112,219 | 10/1963 | Politzer | 117—115 X |
| 3,122,786 | 3/1964 | Huisman | 118—408 X |

ALFRED L. LEAVITT, Primary Examiner

W. E. BALL, Assistant Examiner

U.S. Cl. X.R.

118—405, 419; 264—149, 171, 174